Patented Oct. 15, 1946

2,409,241

UNITED STATES PATENT OFFICE 2,409,241

METHOD OF PRODUCING SUBSTANTIALLY PURE d-TUBOCURARINE CHLORIDE

Joseph T. Bashour, New York, N. Y., assignor to E. R. Squibb & Sons, New York, N. Y., a corporation of New York No Drawing. Application May 17, 1944, Serial No. 536,031

11 Claims. (Cl. 260—236)

This invention relates to d-tubocurarine chloride, the active constituent of curare.

Curare is a plant extract characterized by a relaxing (lissive) effect on the musculature; and when converted into a stable, physiologically-standardized preparation (cf. Holaday application Serial No. 396,871, filed June 6, 1941, now Patent No. 2,397,417, dated March 26, 1946), it is of exceptional utility in the treatment of spastic paralysis; in combination with anesthesia during surgical operations; and as an adjunct to the shock therapy of certain mental conditions. Because of curare's low margin of safety (the range of dosage between that giving the desired skeletal-muscle effect and that giving the undesirable toxic paralysis of the muscles of respiration), the physiological standardization must be precise. Use of the active constituent of curare in substantially pure form would manifestly disnecessitate such precise physiological standardization; but the inefficiency of the prior methods of producing—and the consequent expensiveness of—substantially pure d-tubocurarine chloride has discouraged its widespread use.

It is the object of this invention to provide an efficient method of producing substantially-pure-d-tubocurarine chloride.

The method of this invention essentially comprises treating with picric acid the quaternary-base fraction of a crude curare of the curarine type, and hydrolyzing the resulting picrate in an emulsion of (I) an aqueous strong mineral acid (preferably hydrochloric acid of about 15-20% concentration) and (II) a water-immiscible organic solvent for picric acid (preferably toluene).

The quaternary-base fraction of a crude curare of the curarine type may conveniently be obtained as follows: The crude curare is reduced to a dry powder (for stability in storage), and extracted with a dilute aqueous solution of an organic acid (preferably tartaric); the solution is treated with a lead salt (preferably lead subacetate) to precipitate inactive material, and the filtrate is freed of lead; and the lead-free filtrate is made alkaline, and exhaustively extracted with a water-immiscible organic solvent (e. g., chloroform, ether, benzene, or ethyl acetate) to remove tertiary bases of comparatively low lissive potency, the aqueous phase (quaternary-base fraction) being a relatively pure aqueous solution of d-tubocurarine chloride. The order of treatment may, of course, be varied; for example, the extraction of the tertiary bases may precede the treatment with the lead salt. Desirably, the quaternary-base fraction obtained is concentrated before treatment with picric acid.

In the treatment with picric acid, the d-tubocurarine chloride is selectively precipitated as an insoluble yellow complex with picric acid (in preference to the non-alkaloidal constituents of the solution). Desirably, the separated picrate is dried before hydrolyzing it. On completion of the hydrolysis, the toluene layer formed, containing the picric acid, is rejected (recovery of the readily-available toluene and picric acid not being required); and on refrigeration of the aqueous layer, the bulk of the d-tubocurarine chloride separates in crystalline form and can be readily filtered off and recrystallized.

Among the other solvents which may be employed in place of toluene for the hydrolysis of the picrate are ether, benzene, carbon disulfide, carbon tetrachloride, and amyl alcohol. When using another aqueous strong mineral acid in place of hydrochloric for the hydrolysis of the picrate, the corresponding salt is obtained (e. g., d-tubocurarine sulfate when using sulfuric acid); and, if d-tubocurarine chloride is desired, it may be obtained from such salt in the conventional manner.

Desirably, the mother liquor (which contains about 40% of the total d-tubocurarine chloride in a form not capable of yielding crystals by the usual method) is treated to substantially remove free acid (preferably treated with an anion-exchange, or acid-adsorbent resin, such as Amberlite IR-4, which removes free acids from solution) and dried; and the residue (d-tubocurarine chloride) is crystallized with a minimum quantity of hydrochloric acid, preferably of about 2-25% concentration.

Desirably also, the d-tubocurarine chloride is recrystallized by dissolving in a minimum of hot water, and after the bulk of the d-tubocurarine chloride has precipitated, adding sufficient concentrated hydrochloric acid to bring the HCl content up to about 6%, and refrigerating the solution.

The herein-described recovery of additional d-tubocurarine chloride from the mother liquor, as well as the recrystallization of the crystalline d-tubocurarine chloride, is of general applicability, i. e., useful in connection with other methods of producing substantially pure d-tubocurarine chloride.

The following examples are illustrative of the invention:

EXAMPLE 1

*(a) Preparation of curare powder*

A crude curare syrup of non-specified botanical origin (so-called "Gill" curare) containing 55–60% total solids is extracted with several portions of cold distilled water; the combined extracts (which may contain about 97% of the water-soluble active alkaloids is immediately sterilized by autoclaving, and the water removed by evaporation; and the residue is converted into a fine dry powder (A) by drying below 40° C. in shallow pans in a vacuum oven, and powdering the dried curare in a ball mill.

(b) Extraction of curare powder 500 g. of the powder A is added at a moderate rate to 5 liters of an 0.8% tartaric acid solution while stirring; and the stirring is continued for 1½ hours, 50 g. of a filter-aid (e. g., Hyflo, a processed diatomaceous earth) is added, and the stirring is continued for 10 minutes longer. The mixture is then filtered on a Buchner funnel, and the residue on the funnel is washed with 1.5 liters water containing 2 g. tartaric acid, the wash and the filtrate being combined (solution B).

(c) Precipitation of inactive material with lead subacetate 250 g. lead subacetate [Pb(OH)$_2$(OOCCH$_3$)$_2$] in 3.5 liters water is added during a period of 45–60 minutes to solution B while stirring. If the presence of excess lead is not demonstrable by test (e. g., by the absence of cloudiness on centrifuging a 5-cc. portion of the solution and adding several drops of lead acetate solution to the supernatant), 25 g. more lead subacetate dissolved in 375 cc. distilled water is added. When an excess is demonstrable, 150 g. Hyflo is added, the mixture is stirred 10 minutes longer, and allowed to stand 12–16 hours. The mixture is then filtered on a Buchner funnel, and the filter cake is washed with 2 liters 0.5% lead subacetate solution; the combined filtrate and wash is clarified by filtration through a layer of asbestos; the asbestos filter is washed with 0.5% lead subacetate solution until the wash is colorless; and the asbestos wash and the original filtrate are combined (solution C).

(d) Removal of excess lead

Hydrogen sulfide is passed through solution C at a moderate rate until an excess of hydrogen sulfide is confirmed (as by the lack of precipitate on centrifuging a 10-cc. test portion and passing hydrogen sulfide into the supernatant). 100 g. Hyflo is then added, and mixed well with the liquid; and the mixture is filtered on a Buchner funnel, and the filter cake washed with 2 liters distilled water. The combined filtrate and wash is clarified by refiltration through a layer of asbestos; and carbon dioxide is passed through the solution at a moderate rate for about four hours, to obtain a hydrogen-sulfide-free solution (D).

(e) Separation of tertiary bases 1 lb. sodium bicarbonate is added cautiously in portions to solution D, followed by a gallon of ether, and the mixture is stirred well for 8 minutes, and allowed to separate into layers. The lower aqueous layer is then separated from the ether layer, and re-extracted in the same manner twice with one-gallon portions of ether. [The ether extracts are combined and set aside for recovery of tertiary alkaloids.]

2½ liters chloroform is added to the aqueous phase, the mixture is stirred for seven minutes, and allowed to separate into layers (aqueous and chloroform) for not more than 20 minutes. The clear portion of the lower chloroform layer is removed, and when an emulsified intermediate layer of considerable size is present, it is removed separately. About 25 g. Hyflo per liter is added to the emulsion, and the mixture is moderately stirred and then filtered on a Buchner funnel; and the filtrate—no longer emulsified—is allowed to separate, and the aqueous and chloroform layers added to their respective main bodies. The combined aqueous phase is extracted two more times with 2½-liter portions of chloroform, using the same technique for breaking up the emulsions. [The chloroform extracts are combined and set aside for recovery of tertiary alkaloids.]

(f) Concentration

The tertiary-base-free aqueous solution obtained as described in (e) is made weakly acid to Congo red paper by the cautious addition of cooled dilute sulfuric acid (about 140–170 cc. concentrated sulfuric acid in 1500 cc. distilled water is required); and the acidified solution is concentrated to a volume of about 6 liters (solution F) by heating on a steam bath under a subatmospheric pressure of 10–40 mm. in the presence of 2-ethyl-hexanol (an anti-foam agent).

(g) Formation of picrate 11.5 liters 0.9% aqueous picric acid solution is added over a period of about 40–60 minutes to solution F, while stirring vigorously. Then the mixture is allowed to stand for at least 1½ hours; and the picrate formed (a yellow precipitate) is filtered off on a Buchner funnel, washed with 1½ to 2 liters 0.9% picric acid solution, and sucked dry. The picrate is then spread on shallow pans, dried for 12–16 hours under a current of air, broken up thoroughly, and further dried in a vacuum oven at 40–45° C. for 6–8 hours (yield 165–185 g.).

The dry picrate is dissolved in 2 liters of a mixture of 90 parts acetone and 10 parts anhydrous ethanol while stirring vigorously. After solution is completed and while continuing the stirring, 300 g. of an activated bone charcoal (e. g., Darco G 60) is added, and the stirring is continued for 1½ hours; the mixture is filtered on a Buchner funnel; and the filter cake is washed with 10 liters of the acetone-ethanol solvent.

The combined filtrate and washings (about 12 liters) is concentrated by heating under reduced pressure to 600–800 cc., and poured while hot onto a shallow pan. Then most of the solvent is removed by passing air thereover and rubbing the resulting paste frequently until a crumbly solid is obtained; and the material is further dried in a vacuum oven at 35–40° C. for 2–3 hours. The yield of the purified dry picrate (G) is 135–150 g.

(h) Hydrolysis of the picrate

The picrate G is added in small portions over a period of 15 minutes to a well-stirred, emulsified mixture of 2 liters toluene and 500 cc. 17% hydrochloric acid. After the picrate has completely dissolved (about 15 minutes), stirring is discontinued, the emulsion is permitted to separate, and the toluene layer is removed. 15 liters of fresh toluene is added to the aqueous layer, and the mixture is stirred (emulsified) as before for 5–10 minutes and then permitted to separate, and the toluene layer is removed; this washing being repeated with 15 liters fresh toluene. 320 cc. distilled water is then added to the resulting aqueous layer (which includes some crystallizate) and the solution is refrigerated for 12–16 hours.

The resulting thick suspension is centrifuged at 2000 R. P. M. for 10-12 minutes; the liquid (supernatant) is decanted; and the solid is washed four times by trituration with acetone and centrifugation, transferred with fresh acetone to a sintered glass funnel, sucked dry, and then completely dried in a vacuum desiccator over sulfuric acid. The wash liquids are combined, and filtered through a sintered glass funnel; and the separated solid (about 2 g.) is washed and dried, and added to the main batch. The combined yield is about 60 g. of a white crystalline product (H).

*(i) Recovery from mother liquor*

The aqueous supernatant and the acetone washings obtained in (h) are combined, and this mother liquor is allowed to stand over 650 g. moist Amberlite IR-4 (an anion exchange, or acid-adsorbent, resin prepared by The Resinous Products & Chemical Company, of Philadelphia, Pa.) which has been pretreated as follows: 4 liters 2% hydrochloric acid is added to 1200 g. Amberlite IR-4; after standing 12-16 hours, the resin is filtered off on a Buchner funnel, washed with distilled water until the washings are colorless, and covered with 12 liters 3-4% sodium carbonate solution; and after standing 12-16 hours, the resin is filtered off on a Buchner funnel, washed with distilled water until the washings are colorless and free of carbonate, and maintained in a moist condition until use. If the mother liquor is still acid to Congo red after 2 hours, more of the pretreated Amberlite IR-4 is added; and when the solution is no longer acid to Congo red, the resin is removed by filtration and washed until the washings are almost colorless.

The filtrate and washings are combined, concentrated to about 100 cc., 4 g. Darco is added, and the mixture is heated on a steam bath for at least 10-15 minutes. The Darco is then removed by filtering while hot, and washed with hot water containing a little Darco; and the filtrate and the wash are combined and evaporated to dryness. The residue (about 34 g.) is powdered, rubbed with about 40 cc. 12% hydrochloric acid until homogeneous, and refrigerated 12-16 hours; and the (sandy) precipitate formed is filtered off on a sintered glass filter without using additional solvent (using filtrate for the transfer). The filter cake is then washed with not more than 20 cc. of a mixture of 85 parts acetone and 15 parts 12% hydrochloric acid, and sucked dry; and the drying is completed in a vacuum desiccator over sulfuric acid. The product (about 9 g.) is then recrystallized once [as by the procedure described in (j) hereinafter] to give 6½ to 7 g. of a white crystalline product (I).

*(j) Recrystallization*

The combined crystalline product (H and I) is dissolved in a minimum of hot water on a steam bath (less than 6 cc. hot water per gram of product being required), 3-5 g. Darco G 60 is added, and the heating continued for 10 minutes longer. The mixture is filtered while hot, in a hot-water funnel, and the residues (Darco) in the original container and funnel are washed twice with 5 to 10 cc. portions of water heated in the container; and the filtrate and washings are combined. After standing at room temperature for 12-16 hours, the bulk of the product precipitates. Then the exact quantity of concentrated hydrochloric acid necessary to bring the HCl content of the solution to 6% is added while agitating, and the mixture is refrigerated for 1-2 days.

The precipitate is filtered off on a coarse sintered glass funnel (transfer of the precipitate to the funnel being completed with the aid of the filtrate), washed 3-4 times with quantities of acetone just sufficient to wet the filter cake; and the filter cake is then thoroughly washed with acetone, sucked dry, and dried in a vacuum desiccator over sulfuric acid. Yield (J) about 58 g.

The filtrate (mother liquor) is treated with pretreated Amberlite IR-4 as described in section (i); the acid-free solution is evaporated almost to dryness; and the residue is taken up in a minimum of hot water (not over six times the weight of the residue) on a steam bath, treated with 1 g. Darco, and filtered. After the filtrate has stood 12-16 hours at room temperature, its HCl content is adjusted to 6% by addition of cold concentrated hydrochloric acid, and it is refrigerated for 2-3 days; and the precipitate is filtered off, washed and dried. Yield (J-1) 3-4 g.

The product (J and J-1) is a substantially pure d-tubocurarine chloride having the following characteristics: in a capillary evacuated to less than 2 mm., it melts at 267-273° C. (uncorrected), depending on the rate of heating; its optical rotation [α]$_D$ is +198-210°; and a 1% solution thereof remains water-white on standing 24 hours in a loosely-stoppered transparent bottle exposed to light.

EXAMPLE 2

(a) 100 kg. fresh, green liama stems of *Chondrodendron tomentosum* (Ampi Huasca) is cut into pieces of convenient size and extracted with water that has been acidified to a pH of about 5 with hydrochloric acid. The extract is concentrated until about 4 kg. of a syrupy or molasses-like liquid is obtained and then carefully brought to dryness in vacuo at 55-60° C. The resulting dry brown powder, a crude curare, constitutes about half the weight of the syrup.

(b) 50 g. of the crude curare is exhaustively extracted at room temperature with 400 cc. portions of a 1% aqueous solution of tartaric acid. The dark brown extract is filtered to remove insoluble material (about 2.5 g.), made alkaline by the addition of saturated sodium bicarbonate solution, and exhaustively extracted with chloroform; and the extract (containing tertiary bases) is separated from the aqueous phase.

(c) The aqueous phase is acidified with sulfuric acid to a pH of about 3 to 4, and treated with lead subacetate to complete precipitation. The precipitated lead salts are filtered off, and thoroughly washed with water; and the combined filtrate and washings are freed from lead by treatment with hydrogen sulfide, and the precipitated lead sulfide is filtered off. The filtrate (II), a pale yellow solution, contains 85% of the lissive activity of the crude curare.

(d) The filtrate II is concentrated in vacuo, and treated in the same manner as solution F' in Example 1, i. e., as described in sections (g) et. seq. of Example 1, to obtain substantially pure d-tubocurarine chloride.

EXAMPLE 3

A rude curare powder obtained as described in Example 2 (a) is treated in the same manner as powder A in Example 1, i. e., as described in sections (b) et seq. of Example 1, to obtain substantially pure d-tubocurarine chloride.

When using the authenticated curare obtained from a single plant species, as in Examples 2 and 3, the picrate formed need not be subjected to the charcoal (Darco) treatment described in section (g) of Example 1.

The invention may be variously otherwise embodied within the scope of the appended claims.

I claim:

1. The method which essentially comprises treating with picric acid the quaternary-base fraction of a crude curare of the curarine type, and hydrolyzing the resulting picrate in an emulsion of an aqueous strong mineral acid and a water-immiscible organic solvent for picric acid.

2. The method of producing substantially-pure d-tubocurarine chloride which essentially comprises treating with picric acid the quaternary-base fraction of a crude curare of the curarine type, and hydrolyzing the resulting picrate in an emulsion of hydrochloric acid and a water-immiscible organic solvent for picric acid.

3. The method of producing substantially-pure d-tubocurarine chloride which essentially comprises treating with picric acid the quaternary-base fraction of a crude curare of the curarine type, and hydrolyzing the resulting picrate in an emulsion of about 15–20% hydrochloric acid and a water-immiscible organic solvent for picric acid.

4. The method of producing substantially-pure d-tubocurarine chloride which essentially comprises treating with picric acid the quaternary-base fraction of a crude curare of the curarine type, and hydrolyzing the resulting picrate in an emulsion of about 17% hydrochloric acid and a water-immiscible organic solvent for picric acid.

5. The method of producing substantially-pure d-tubocurarine chloride which essentially comprises treating with picric acid the quaternary-base fraction of a crude curare of the curarine type and hydrolyzing the resulting picrate in an emulsion of hydrochloric acid and toluene.

6. The method of producing substantially-pure d-tubocurarine chloride which essentially comprises treating with picric acid the quaternary-base fraction of a crude curare of the curarine type, drying the resulting picrate, and hydrolyzing the dried picrate in an emulsion of hydrochloric acid and a water-immiscible organic solvent for picric acid.

7. The method of producing substantially-pure d-tubocurarine chloride which essentially comprises treating with picric acid the quaternary-base fraction of a crude curare of the curarine type, hydrolyzing the resulting picrate in an emulsion of hydrochloric acid and a water-immiscible organic solvent for picric acid, and recovering crystalline d-tubocurarine chloride from the aqueous phase.

8. The method of producing substantially-pure d-tubocurarine chloride which essentially comprises treating with picric acid the quaternary-base fraction of a crude curare of the curarine type, hydrolyzing the resulting picrate in an emulsion of hydrochloric acid and a water-immiscible organic solvent for picric acid, separating the precipitated d-tubocurarine chloride from the aqueous phase, treating the mother liquor with an acid-adsorbing resin, drying the treated mother liquor, and crystallizing the residue with a minimum quantity of hydrochloric acid.

9. The method of producing substantially pure d-tubocurarine chloride which essentially comprises treating with picric acid the quaternary-base fraction of a crude curare of the curarine type, hydrolyzing the resulting picrate in an emulsion of hydrochloric acid and a water-immiscible organic solvent for picric acid, recovering crystalline d-tubocurarine chloride from the aqueous phase, dissolving the d-tubocurarine chloride in a minimum of hot water, allowing the solution to stand at room temperature until the bulk of the d-tubocurarine chloride precipitates, adding sufficient concentrated hydrochloric acid to bring the HCl content up to about 6%, and refrigerating the solution.

10. In the method of producing substantially pure d-tubocurarine chloride from a crude curare of the curarine type, the steps of treating an acidic aqueous mother liquor from the crystallization of d-tubocurarine chloride with an acid-adsorbing resin, drying the treated mother liquor, and crystallizing the residue with a minimum quantity of hydrochloric acid.

11. In the method of producing substantially-pure d-tubocurarine chloride from a crude curare of the curarine type, the steps of dissolving the crystalline d-tubocurarine chloride in a minimum of hot water, allowing the solution to stand at room temperature until the bulk of the d-tubocurarine chloride precipitates, adding sufficient hydrochloric acid to bring the HCl content to about 6%, and refrigerating the solution.

JOSEPH T. BASHOUR.